Patented Sept. 9, 1930

1,775,590

UNITED STATES PATENT OFFICE

ALFRED ENGELHARDT, OF WIESDORF-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PROCESS FOR THE EXTRACTION OF FAT FROM RAW WOOL

No Drawing. Application filed September 12, 1927, Serial No. 219,176, and in Germany September 21, 1926.

The present invention concerns a process for the degreasing of raw wool according to which chloro-xylene is used as solvent.

In the extraction of raw wool by means of organic solvents, carbon disulphide and benzine were originally used and subsequently endeavours were made to replace these highly inflammable solvents by low boiling chlorohydrocarbons, such as carbon tetrachloride and trichloro-ethylene. However no practical results were achieved, because the loss of these solvents was very great on account of their great volatility. Apprehensions were felt to the use of less volatile chlorohydrocarbons of higher boiling points, since it was believed that the high boiling chlorohydrocarbons only incompletely could be recovered from the degreased wool and the wool fat, analogously to the residue from the extraction of oils for human consumption or the extracted oil, resulting therefrom, olive oil for example.

According to the present invention, a chloro-xylene, of which five isomeric ones are known, or a mixture of different chloroxylenes, can be used, said chloro-xylenes and their mixtures boiling between about 185° to 190° C. and being liquid at the temperature at which they are used, i. e. a temperature from about 20° to about 50° C. for the extraction of raw wool, which after degreasing is readily freed from the respective solvent in the usual manner by washing and aeration, while the chloro-xylene is distilled off from the wool fat, the last traces of the solvent being removed by steam distillation.

The use of these chlorohydrocarbons enables the degreasing of wool in open, continuously working apparatus, which was impossible with the hitherto proposed solvents.

Example 1

The raw wool is freed from dust by beating, and freed from salt by treatment with water. After pressing out the adherent water, the wool is passed through 2 or 3 Leviathan-washers, (compare Übbelohde, Handbuch der Oele und Fette, Vol. 4, page 696) the chloroxylene running in according to the counter-current principle. It is slightly pressed out each time when passing from one washer into the other.

The wool thus degreased is then freed from the chloroxylene (which still may be adhering) in the washers filled with water. It goes then over a band-dryer where the last traces of the adherent chloroxylene are driven off by warm air.

The solution of the wool fat in chloroxylene is separated in a centrifuge from the admixed water and then the solvent evaporated under reduced pressure. The distillate is used again for washing purposes, while the remaining raw wool fat is freed from the last traces of chloroxylene by steaming. From the wash-water the rest of chloroxylene can be obtained by evaporation.

Example 2

An optional amount of raw wool is at first freed of dust by beating and then, while spread on a permeable, movable bed, e. g., an endless chain, is freed from potash and other salts by sprinkling with warm water at 40° C. The absorbed water is then removed, and the wool is led through two or three continually operating washers connected in series. The first washer contains, for example, chlorxylol as a solvent for the wool fat. The liquid is kept at about 30–40° C. The solvent runs off at one end enriched with about 10 per cent wool fat. When the wool has gone through the first washer, it then goes through a wringer (preferably consisting of two rollers) and falls into a second washer, similarly constructed, containing a fresh chlorxylol solution. This chlorxylol solution serves for the continual replacement of the concentrated wool fat solution running out of the first washer. The amount of the chlorxylol to be added depends upon the more or less large content of fat in the wool. After the wool is led through the second washer, it again goes over a wringer into a third, similarly constructed, washer in which the remaining amounts of adhering dirt along with the greatest part of the still adhering solvent are washed out with the help of soap-water (about 1%). The wool which has finally been wrung out, then goes into the drum or belt driers generally used in the wool industry, into which air is blown according to the counter-current principle until all the water, and the last remainders of the solvents used, are removed. The wool fat can be removed from the chlorxylol-wool fat solutions obtained according to the known methods,— for example, by steam distillation with the simultaneous recovery of the chlorxylol.

I claim:

1. In the process of degreasing raw wool, the step which comprises treating the raw wool with chloro-xylene at a temperature from about 20° to about 50° C.

2. The process which comprises treating in several stages raw wool with chloro-xylene at a temperature from about 20° C. to about 50° C., slightly pressing the wool after each stage, washing the degreased wool with soap water, removing the soap water and drying the wool.

In testimony whereof I have hereunto set my hand.

ALFRED ENGELHARDT.

CERTIFICATE OF CORRECTION.

Patent No. 1,775,590.   Granted September 9, 1930, to

ALFRED ENGELHARDT.

It is hereby certified that error appears in the printed specification of the above numbered patent requiring correction as follows: Page 1, after line 42, insert "The following examples will serve to illustrate my invention without being limited thereto"; and that the said Letters Patent should be read with this correction therein that the same may conform to the record of the case in the Patent Office.

Signed and sealed this 21st day of October, A. D. 1930.

(Seal)

M. J. Moore,
Acting Commissioner of Patents.

finally been wrung out, then goes into the drum or belt driers generally used in the wool industry, into which air is blown according to the counter-current principle until all the water, and the last remainders of the solvents used, are removed. The wool fat can be removed from the chlorxylol-wool fat solutions obtained according to the known methods,— for example, by steam distillation with the simultaneous recovery of the chlorxylol.

I claim:

1. In the process of degreasing raw wool, the step which comprises treating the raw wool with chloro-xylene at a temperature from about 20° to about 50° C.

2. The process which comprises treating in several stages raw wool with chloro-xylene at a temperature from about 20° C. to about 50° C., slightly pressing the wool after each stage, washing the degreased wool with soap water, removing the soap water and drying the wool.

In testimony whereof I have hereunto set my hand.

ALFRED ENGELHARDT.

CERTIFICATE OF CORRECTION.

Patent No. 1,775,590.              Granted September 9, 1930, to

ALFRED ENGELHARDT.

It is hereby certified that error appears in the printed specification of the above numbered patent requiring correction as follows: Page 1, after line 42, insert "The following examples will serve to illustrate my invention without being limited thereto"; and that the said Letters Patent should be read with this correction therein that the same may conform to the record of the case in the Patent Office.

Signed and sealed this 21st day of October, A. D. 1930.

(Seal)

M. J. Moore,
Acting Commissioner of Patents.